United States Patent [19]

Miyazaki

[11] Patent Number: 5,181,183
[45] Date of Patent: Jan. 19, 1993

[54] DISCRETE COSINE TRANSFORM CIRCUIT SUITABLE FOR INTEGRATED CIRCUIT IMPLEMENTATION

[75] Inventor: Takashi Miyazaki, Tokyo, Japan

[73] Assignee: NEC Corporation, Tokyo, Japan

[21] Appl. No.: 642,571

[22] Filed: Jan. 17, 1991

[30] Foreign Application Priority Data

Jan. 17, 1990 [JP] Japan .................................... 2-6440

[51] Int. Cl.[5] .......................................... G06F 15/332
[52] U.S. Cl. ................................................ 364/725
[58] Field of Search ............................... 364/725, 726

[56] References Cited

U.S. PATENT DOCUMENTS

| | | | |
|---|---|---|---|
| 4,288,858 | 9/1981 | Merola et al. | 364/725 |
| 4,293,920 | 10/1981 | Merola | 364/725 |
| 4,675,836 | 6/1987 | Arnould et al. | 364/725 |
| 4,760,543 | 7/1988 | Ligtenberg et al. | 364/725 |
| 4,791,598 | 12/1988 | Liou et al. | 364/725 |
| 5,053,985 | 10/1991 | Friedlander et al. | 364/725 |

OTHER PUBLICATIONS

J. C. Carlach et al, "TCAD: a 27 MHz 8 × 8 Discrete Cosine Transform Chip" at ICASSP 1989, Glasgow, Scotland, May 23-26, 1989, vol. 4, pp. 2429-2432.
P. Duhamel et al, "New $2^n$ DCT Algorithms Suitable for VLSI Implementation" at ICASSP 1987, Dallas, TX, Apr. 6-9, 1987, vol. 3, pp. 1805-1808.

Primary Examiner—David H. Malzahn
Attorney, Agent, or Firm—Sughrue, Mion, Zinn, Macpeak & Seas

[57] ABSTRACT

A discrete cosine transform (DCT) circuit providing DCT and inverse DCT results, receiving N input data and a selection signal, includes a first switch for selecting input data or accumulation data, a combining circuit transforming N input data into N/2 combination data, an adding/substracting circuit producing N subtraction and addition data from the combination data, a second switch for selecting one of the input data and the accumulation data, a permutation circuit producing permutated data based on the input data, a third switch for selecting one of the addition and subtraction data and the permutated data, a plurality of transforming circuits coupled to the third switch for transforming and accumulating data to produce the accumulation data, a fourth switch selecting one of the addition and substraction data and the permutated data and a selector circuit operatively coupled to the first and second switches for selecting the outputs of the transforming circuits in a predetermined order. According to one aspect of the invention one of a DCT result and an inverse DCT result are produced in the DCT circuit based on the selection signal. Both one and two dimension DCT results can be produced by the DCT circuit. A DCT circuit producing two-dimensional DCT results further includes a transposition memory device.

12 Claims, 9 Drawing Sheets

DISCRETE COSINE TRANSFORM CIRCUIT SUITABLE FOR INTEGRATED CIRCUIT IMPLEMENTATION

BACKGROUND OF THE INVENTION

The present invention relates to a circuit for performing discrete cosine transform (DCT) and, more particularly, to a DCT circuit suitable for integrated circuit implementation and readily applicable to inverse DCT (IDCT) and two-dimensional DCT as well.

DCT belongs to a family of orthogonal transform techniques and achieves highly efficient coding of moving picture signals such as a television signal. Since a DCT circuit needs a rapid convolution operation capability, it in most cases has been implemented with a digital signal processor (DSP) or similar signal processing LSI. Today, exclusive LSI's for DCT operations (DCT LSI) in the form of chips are in development with the help of advancing device fabrication technologies, extended studies on DCT high-speed operation algorithm, etc. Such a DCT LSI was reported by J. C. Carlach et al. in a paper entitled "TCAD: a 27 MHz 8×8 Discrete Cosine Transform Chip" at ICASSP '89 held in Glasgow, Scotland in May 23-26, 1989. The DCT LSI disclosed in this paper executes 8-point one-dimensional DCT by Duhamel Algorithm which will be described. Specifically, this DCT LSI transforms eight input data (assume data $x_0$ to $x_7$) into eight terms $(x_0 \pm x_7)$, $(x_1 \pm x_6)$, $(x_2 \pm x_5)$ and $(x_3 \pm x_4)$ by addition and subtraction, thereby halving the required number of times of multiplication by DCT coefficients. Further, the DCT LST converts the value of each term into an read address by a decoder to address a ROM which has stored operation results beforehand, the ROM thus serving as a multiplier. The drawback with the DCT LSI proposed by Carlach et al. is that regarding 8-point DCT, it inputs eight input data $x_0$ to $x_7$ at the same time and, therefore, needs complicated circuitry for generating the above-mentioned eight terms (referred to as "shuffling stage" in the paper). Moreover, the paper does not describe any specific circuitry for using DCT LSI as IDCT LSI.

SUMMARY OF THE INVENTION

It is therefore an object of the present invention to provide a DCT circuit readily operable in either one of DCT and IDCT modes, as desired.

It is another object of the present invention to provide a DCT circuit operable in a two-dimensional DCT mode and a circuit for executing DCT operations at high speed.

A discrete cosine transform (DCT) circuit of the invention for performs DCT or inverse DCT (IDCT) with N ($N=2^x$ where x is a natural number) input data in response to a selection signal fed from the outside so as to produce transformed data, comprises a first switch circuit for producing first selected input data by selecting, in response to the selection signal, either one of input data and selected accumulation data produced in said DCT circuit. A combining circuit transforms N of the first selected input data into N/2 combination data each comprising a combination of two predetermined data. An adding and substracting circuit produce N subtraction and addition data by adding first and second data of each of the combination data and subtracting the second data from the first data. A second switch circuit produces second selected input data by selecting, in response to the selection signal, either one of said input data and the selected accumulation data. A permutation circuit outputs permutated data by permutating N of the second selected input data in a predetermined order. A third switch circuit outputs data to be transformed by selecting, in response to the selection signal, either one of the addition and subtraction data and the permutated data. A fourth switch circuit outputs the transformed data by selecting, in response to the selection signal, the other of the permutated data and the addition and subtraction data. An N/2 transforming circuit has an identical construction and performs DCT operations. Each of the N/2 transforming circuit includes a coefficient memory for storing DCT coefficients and IDCT coefficients, a multiplier for reading, in response to the selection signal, either one of the DCT coefficients and the IDCT coefficients out of the memory and multiplying the data to be transformed by the coefficients to produce multiplication data, and an accumulator for accumulating the multiplication data a predetermined number of times to output accumulated data. The DCT circuit of the invention further comprises a selector for selecting the accumulated data from the N/2 transforming circuit in a predetermined order and feeding the selected accumulated data to the first and second switch means as selected accumulated data.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENTS

Figure 1:
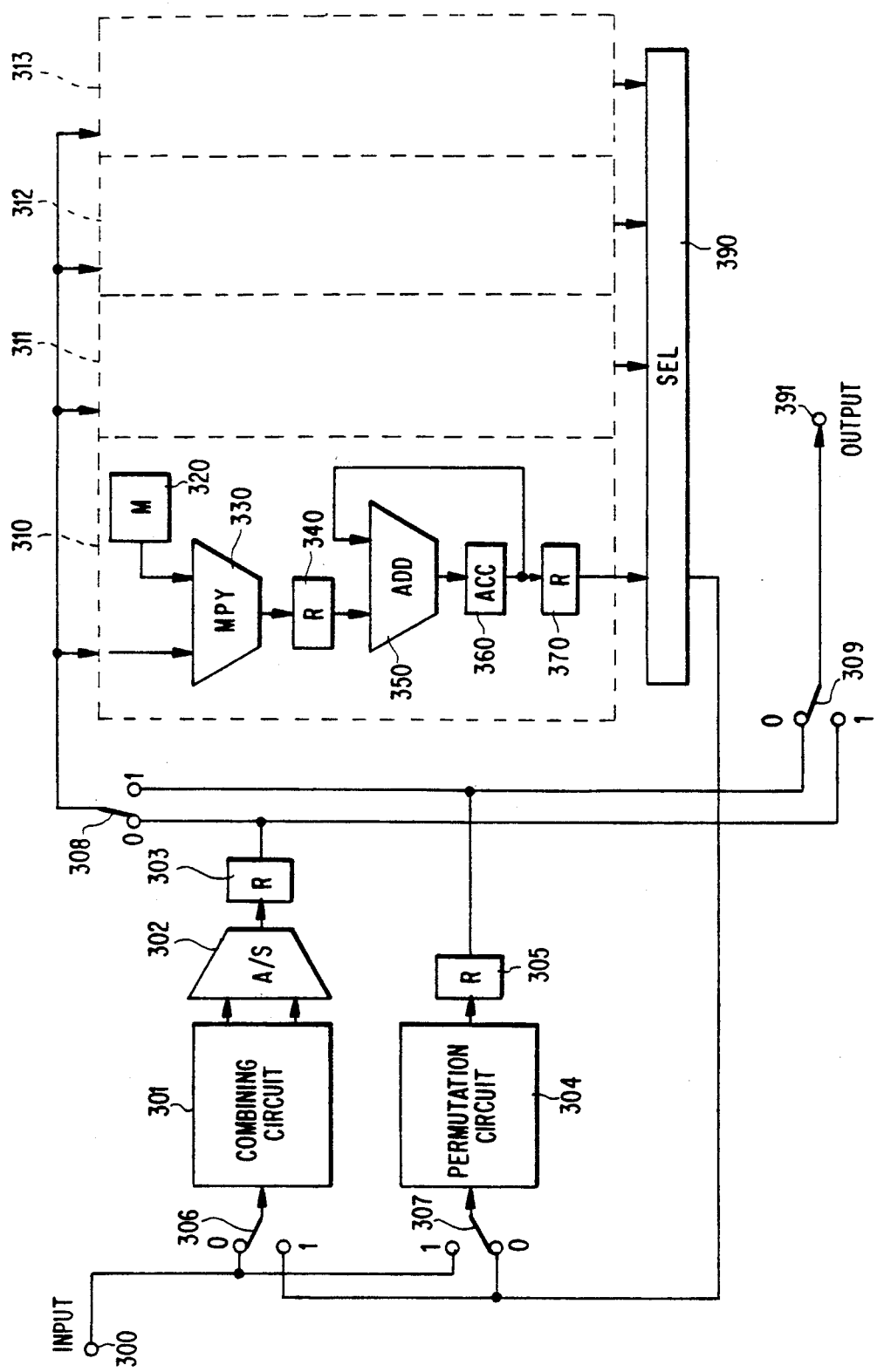
FIG. 1 is a block diagram showing a DCT circuit embodying the present invention.

To better understand the present invention, Duhamel Algorithm which the present invention adopts for DCT and IDCT will be outlined. Duhamel Algorithm was presented by the title of "NEW $2^n$ DCT ALGORITHMS SUITABLE FOR VLSI IMPLEMENTATION" in ICASSP '87 held in Apr. 6-9, 1987 at Registry Hotel, Texas, U.S.A. Paying attention to the symmetry of DCT coefficients, this algorithm decomposes DCT into polynomial products and then evaluates them by Distributed Arithmetic. Assuming that N ($N=2^n$: n is a natural number)-point one-dimensional DCT input data is $x_j$ and output data is $y_i$, the output data $y_i$ is expressed as:

$$y_i = \sqrt{(2/N)} \cdot \sum_{j=0}^{N-1} x_j \cdot u(i) \cdot \cos[(2j+1)i\pi/2N] \quad (1)$$

where
$i = 0, 1, \ldots, N-1$
$j = 0, 1, \ldots, N-1$ $$u(i) = \begin{bmatrix} 1/\sqrt{2} & (i=0) \\ 1 & (i=1, 2, \ldots, N-1) \end{bmatrix}$$

The above equation (1) is represented by a matrix, as follows:

$$y = Cx \quad (2)$$

where x is $N \times 1$ input data vectors and given by $$x = \begin{bmatrix} x_0 \\ x_1 \\ x_2 \\ \cdot \\ \cdot \\ \cdot \\ x_{N-1} \end{bmatrix}$$

y is $N \times 1$ output data vectors and given by $$y = \begin{bmatrix} y_0 \\ y_1 \\ y_2 \\ \cdot \\ \cdot \\ \cdot \\ y_{N-1} \end{bmatrix}$$

C is an $N \times N$ DCT coefficient matrix and given by $$C = \begin{bmatrix} C_{0,0} & C_{0,1} & C_{0,2} & C_{0,3} & \ldots & C_{0,N-1} \\ C_{1,0} & C_{1,1} & C_{1,2} & C_{1,3} & \ldots & \cdot \\ C_{2,0} & C_{2,1} & C_{2,2} & C_{2,3} & \ldots & \cdot \\ C_{3,0} & C_{3,1} & C_{3,2} & C_{3,3} & \ldots & \cdot \\ \cdot & \cdot & \cdot & \cdot & \ldots & \cdot \\ \cdot & \cdot & \cdot & \cdot & \ldots & \cdot \\ \cdot & \cdot & \cdot & \cdot & \ldots & \cdot \\ C_{N-1,0} & \cdot & \cdot & \cdot & \ldots & C_{N-1,N-1} \end{bmatrix}$$

The individual factors $C_{i,j}$ of the coefficient matrix C is:

$$C_{i,j} = \sqrt{(2/N)} \cdot u(i) \cdot \cos[(2j+1)i\pi/2N] \quad (3)$$

The individual factors of the DCT coefficient matrix are related as:

$$C_{i,j} = (-1)^i \cdot C_{i,(N-j-1)} \quad (4)$$

Assuming that N is "8", for example, then the equation (2) may be modified by using the above relation, as follows:

$$\begin{bmatrix} y_0 \\ y_2 \\ y_4 \\ y_6 \\ y_1 \\ y_3 \\ y_5 \\ y_7 \end{bmatrix} = \quad (5)$$

$$\begin{bmatrix} C_{0,0} & C_{0,1} & C_{0,2} & C_{0,3} & 0 & 0 & 0 & 0 \\ C_{2,0} & C_{2,1} & C_{2,2} & C_{2,3} & 0 & 0 & 0 & 0 \\ C_{4,0} & C_{4,1} & C_{4,2} & C_{4,3} & 0 & 0 & 0 & 0 \\ C_{6,0} & C_{6,1} & C_{6,2} & C_{6,3} & 0 & 0 & 0 & 0 \\ 0 & 0 & 0 & 0 & C_{1,0} & C_{1,1} & C_{1,2} & C_{1,3} \\ 0 & 0 & 0 & 0 & C_{3,0} & C_{3,1} & C_{3,2} & C_{3,3} \\ 0 & 0 & 0 & 0 & C_{5,0} & C_{5,1} & C_{5,2} & C_{5,3} \\ 0 & 0 & 0 & 0 & C_{7,0} & C_{7,1} & C_{7,2} & C_{7,3} \end{bmatrix}$$

$$\cdot \begin{bmatrix} X_0 + X_7 \\ X_1 + X_6 \\ X_2 + X_5 \\ X_3 + X_4 \\ X_0 - X_7 \\ X_1 - X_6 \\ X_2 - X_5 \\ X_3 - X_4 \end{bmatrix}$$

As the equation (5) indicates, N-point one-dimensional DCT is such that, in an vector x having N data $(x_0, \ldots, X_{N-1})$ as components, N input data are transformed into data combinations $(x_0, x_{N-1})$, $(x_1, x_{N-2}), \ldots, (x_{N/2-1}, x_{N/2})$, and then the data constituting the combinations are added and subtracted each other to use the results as input data vectors. This is successful in replacing a part of the DCT coefficients with zero and thereby halving the required number of times of multiplication of DCT coefficients and input data vector factors. Likewise, regarding IDCT, assuming that an input data vector and an output data vector are $y(y_0, y_1, \ldots, y_{N-1})$ and $x(x_0, x_1, \ldots, x_{N-1})$, and that the $N \times N$ IDCT coefficient matrix is D, then $$\begin{bmatrix} z_0 \\ z_2 \\ z_4 \\ z_6 \\ z_1 \\ z_3 \\ z_5 \\ z_7 \end{bmatrix} = \quad (6a)$$

$$\begin{bmatrix} d_{0,0} & d_{0,2} & d_{0,4} & d_{0,6} & 0 & 0 & 0 & 0 \\ d_{2,0} & d_{2,2} & d_{2,4} & d_{2,6} & 0 & 0 & 0 & 0 \\ d_{4,0} & d_{4,2} & d_{4,4} & d_{4,6} & 0 & 0 & 0 & 0 \\ d_{6,0} & d_{6,2} & d_{6,4} & d_{6,6} & 0 & 0 & 0 & 0 \\ 0 & 0 & 0 & 0 & d_{1,1} & d_{1,3} & d_{1,5} & d_{1,7} \\ 0 & 0 & 0 & 0 & d_{3,1} & d_{3,3} & d_{3,5} & d_{3,7} \\ 0 & 0 & 0 & 0 & d_{5,1} & d_{5,3} & d_{5,5} & d_{5,7} \\ 0 & 0 & 0 & 0 & d_{7,1} & d_{7,3} & d_{7,5} & d_{7,7} \end{bmatrix}$$

-continued $$\begin{bmatrix} y_0 \\ y_2 \\ y_4 \\ y_6 \\ y_1 \\ y_3 \\ y_5 \\ y_7 \end{bmatrix}$$

(6b)

$$\begin{bmatrix} x_0 \\ x_1 \\ x_2 \\ x_3 \\ x_4 \\ x_5 \\ x_6 \\ x_7 \end{bmatrix} = \begin{bmatrix} z_0 + z_1 \\ z_2 + z_3 \\ z_4 + z_5 \\ z_6 + z_7 \\ z_0 - z_1 \\ z_2 - z_3 \\ z_4 - z_5 \\ z_6 - z_7 \end{bmatrix}$$

As the equations (6a) and (6b) indicate, in N-point one-dimensional IDCT, separating the N components $(y_0, y_1, \ldots, y_{N-1})$ of the input data vector into even components and odd components is successful in replacing one half of the IDCT coefficients with zero and thereby halving the required number of times of multiplication of IDCT coefficients and input data vector. By combining the convolution results of IDCT coefficients and individual components $y_0$ to $y_7$ and then adding and subtracting the elements constituting each combination data, it is possible to produce $x_0$ to $x_7$ which are the IDCT results.

Referring to FIG. 1 of the drawings, a DCT circuit embodying the present invention will be described. As shown, the DCT circuit has a data input terminal 300, a first to a fourth switch 306 to 309, a first to a fourth convolution operation circuit 310 to 313, a first and a second register 303 and 305, an adder/subtractor 302, a combining circuit 301, a permutation circuit 304, a selector 390, and a data output terminal 391. This embodiment is configured to execute 8-point one-dimensional DCT and IDCT. In a DCT mode, input data having a predetermined number of bits is applied via the data input terminal 300 to one input terminal of the first and second switches 306 and 307. The results of convolution operations are fed to the other input terminal of the switches 306 and 307 from the selector 390, as will be described. Controlled by a controller, not shown, the switches 306 and 307 each selects one of such two different inputs at a time. Specifically, as shown FIG. 1, the switch 306 selects one input terminal to feed the input data to the combining circuit 301 while the switch 307 selects the other input terminal to feed a result of convolution operation from the selector 390 to the permutation circuit 304. Conversely, in an IDCT mode, the switches 306 and 307 select the result of convolution operations and input data, respectively. The combining circuit 301 is implemented with, for example, a shift register, a selector and a ROM storing combination information and outputs each two input data in a predetermined combination at a time. Specifically, receiving the input data $x_0$ to $x_7$, the combining circuit 301 sequentially delivers $(x_0, x_7)$, $(x_1, x_6)$, $(x_2, x_5)$, $(x_3, x_4)$, $(x_0, x_7)$, $(x_1, x_6)$, $(x_2, x_5)$ and $(x_3, x_4)$ in this order to the adder/subtractor 302. In response, the adder/subtractor 302 performs, for example, addition with each of the preceding four combinations of data and subtraction with each of the succeeding combinations of data, feeding the results to the first register 303 one after another. As a result, the register 303 sequentially memorizes eight sum data and difference data, i.e., $(x_0+x_7)$, $(x_1+x_6)$, $(x_2+x_5)$, $(x_3+x_4)$, $(x_0-x_7)$, $(x_1-x_6)$, $(x_2-x_5)$ and $(x_3-x_4)$ while sequentially feeding them to one input terminal of the third and fourth switches 308 and 309. In a DCT mode, the switch 308 selects one input terminal thereof to deliver the sum and difference data to the first to fourth convolution operation circuits 310 to 313 having an identical construction. Specifically, the convolution operation circuits 310 to 313 perform convolution operations with the first to fourth sum data $\{(x_0+x_7), (x_1+x_6), (x_2-x_5), (x_3+x_4)\}$ by using DCT coefficients stored in individual memories. The resultant first to fourth convolution data $(y_0, y_2, y_4, y_6)$ are fed from the circuits 310 to 313 to the selector 390. The selector 390 selects one of such first to fourth convolution data at a time and feeds it to the permutation circuit 304 via the switch 307. Subsequently, the circuits 310 to 313 perform convolution operations with the fifth to eighth data or substraction data $\{(x_0-x_7), (x_1-x_6), (x_2-x_5), (x_3-x_4)\}$ as with the first to fourth data. The resultant fifth to eighth convolution data $(y_1, y_3, y_5, y_7)$ are also sequentially fed from the circuits 310 to 313 to the permutation circuit 304 via the selector 390. The permutation circuit 304 has, for example, a registor, a selector and a ROM storing selection information meant for the selector and permutates the first to eight data fed thereto from the selector 390 as mentioned above. The permutated data, i.e., DCT results $y_0$ to $y_7$ are fed out from the permutation circuit 304 one after another. The DCT results each is temporarily stored in the second register 305 and then fed out via the fourth switch 309 and output terminal 391.

In an IDCT mode, the switches 306 to 309 each is switched to the opposite state to the state shown in FIG. 1. Then, input data from the input terminal 300 is routed to the permutation circuit 304. At this time, the permutation circuit 304 permutates the first and eighth input data $y_0$ to $y_7$ as $(y_0, y_2, y_4, y_6, y_1, y_3, y_5, y_7)$ and delivers them to the convolution operation circuits 310 to 313 via the register 305 and switch 308. By reading IDCT coefficients out of individual coefficient memories, the circuits 310 to 313 perform convolution operations with the data $y_0, y_2, y_4$ and $y_6$ to feed the resultant first to fourth convolution data $z_0, z_2, z_4$ and $z_6$ to the selector 390. In response, the selector 390 sequentially delivers the data $z_0$ to $z_6$ to the combining circuit 301 via the switch 306. Subsequently, the circuits 310 to 313 perform convolution operations with the data $y_1, y_3, y_5$ and $y_7$ and feeds the resultant fifth to eighth convolution data $z_1, z_3, z_5$ and $z_7$ to the selector 390. Again, the selector 390 delivers such data $z_1, z_3, z_5, z_7$ one by one to the combining circuit 301 via the switch 306. The combining circuit 301 combines the first to eighth convolution data $z_0$ to $z_7$ to produce first to fourth combination data $(z_0, z_1)$, $(z_2, z_3)$, $(z_4, z_5)$ and $(z_6, z_7)$ and sequentially feeds them to the adder/subtractor 302. Then, the adder/subtractor 302 performs addition and subtraction with each of the first to fourth combination data to produce $(z_0+z_1)$, $(z_2+z_3)$, $(z_4+z_5)$, $(z_6+z_7)$, $(z_0-z_1)$, $(z_2-z_3)$, $(z_4-z_5)$ and $(z_6-z_7)$. These sum and difference data are sequentially fed out via the register 303, switch 309 and output terminal 391 as IDCT results ($x_0$ to $x_7$) each being associated with respective one of the input data ($y_0$ to $y_7$).

A specific construction of the first convolution operation circuit 310 is shown in FIG. 1. It is to be noted that the construction and operation which will be described is also true with the second to fourth convolution operation circuits 311 to 313. As shown, the convolution operation circuit 310 is made up of a coefficient memory 320 in which DCT coefficients and IDCT coefficients are stored beforehand, a multiplier 330, a third and a fourth register 340 and 370, an adder 350, and an accumulator 360. The multiplier 330 is connected at one input terminal to the switch 308 and at the other input terminal to the coefficient memory 320. In a DCT mode, the multiplier 330 multiplies sum and difference data from the register 303 and DCT coefficients read out of the coefficient memory 320 while, in an IDCT mode, it multiplies permutated input data from the register 305 and IDCT coefficients read out of the memory 320. The result of multiplication is fed to one input terminal of the adder 350 via the register 340. The adder 350 adds the result of multiplication fed from the register 340 and the cumulative value fed from the accumulator 360 and applies the sum to the accumulator 360 as a new cumulative value. The accumulator 360 temporarily stores the cumulative value fed from the adder 350 and, in synchronism with the data output from the register 340, delivers the cumulative value to the other input terminal of the adder 350. The output value of the accumulator 360 is also applied to the register 370. The register 370 memorizes the cumulative value of the accumulator 360 at a predetermined period, i.e., every time the convolution operation is effected a predetermined number of times and feeds it to the selector 390 as convolution data. In the illustrative embodiment, in both of the DCT and IDCT modes, desired data is produced by four consecutive times of convolution operation. For example, the component $Y_0$ of the output data vector y is produced by $C_{0,0}x$ $(x_0+x_7)+C_{0,1}x$ $(x_1+x_6)+C_{0,2}x$ $(x_2+x_5)+C_{0,3}x$ $(x_3+x_4)$, as seen from the equation (5). Hence, the register 370 latches the cumulative value of the accumulator 360 every time the convolution operation is executed four times, while delivering it to the selector 390 as convolution data. At this instant, the accumulator 360 is cleared to perform another convolution operation. Such a sequences of steps is executed in parallel by all of the four convolution operation circuits 310 to 313. A control circuit, not shown, operates the switches 306 to 309, conditions the adder/subtractor 302 selectively for addition or subtraction, controls the combining circuit 301 and permutation circuit 304, controls the operation timings of registers 303, 305, 340 and 370, controls the read-out of data out of the coefficient memories 320, clears the accumulators 360, and controls the selector 390. In summary, the embodiment of FIG. 1 has the switches 306 to 309 to set up particular data paths for each of a DCT mode and an IDCT mode and changes over the characteristics of the combining circuits 301 and permutation circuit 304 as well as the read addresses of the coefficient memories 320. The embodiment, therefore, implements a simple DCT circuit having both of DCT and IDCT capabilities.

Figure 2:
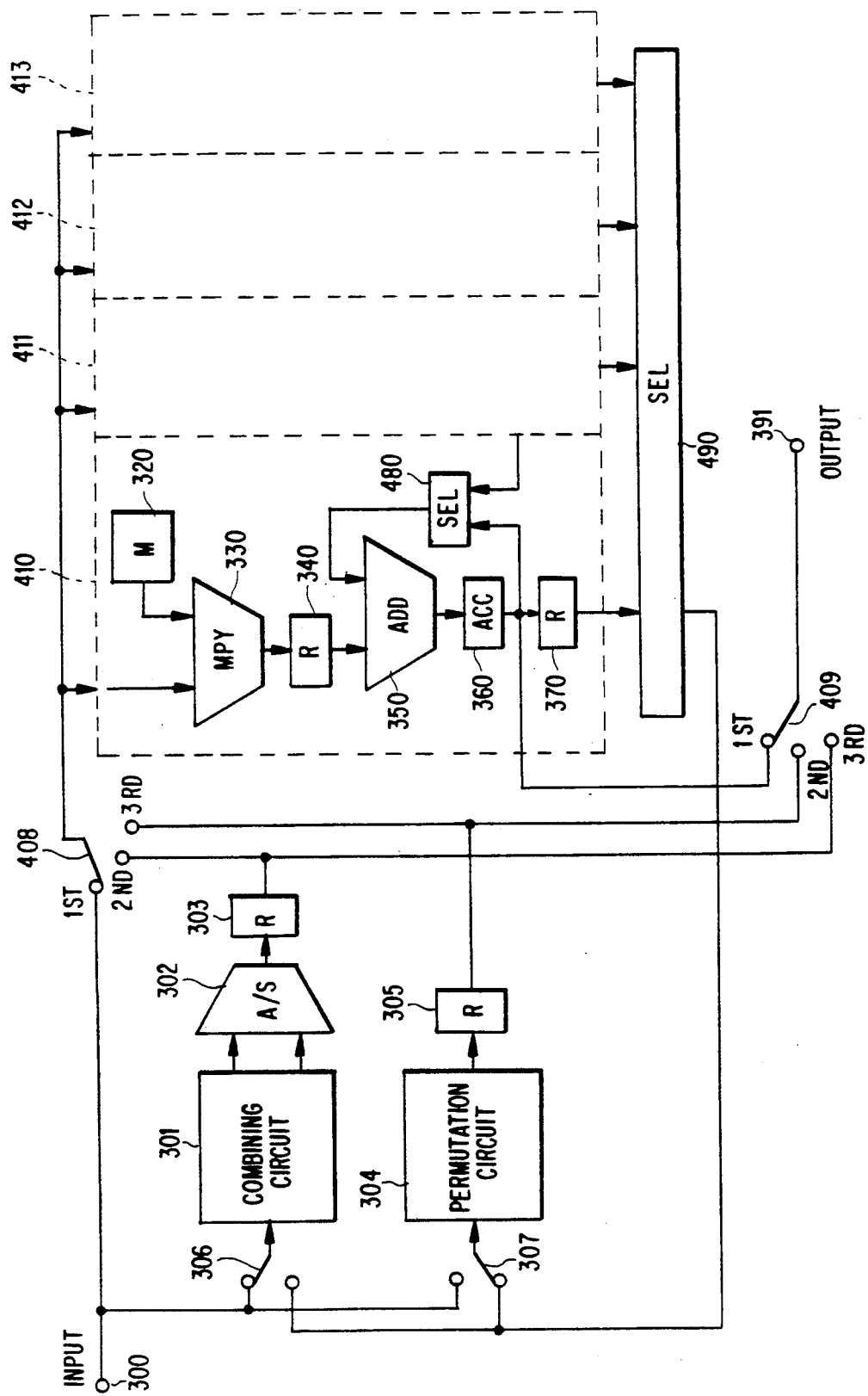
FIG. 2 is a block diagram showing an alternative embodiment of the present invention.

FIG. 2 shows an alternative embodiment of the present invention which additionally achieves the function of an FIR (Finite Impulse Response) filter by use of the convolution operation circuits 310 to 313, FIG. 1. In the figures, the same or similar components are designated by like reference numerals, and redundant description will be avoided for simplicity. This embodiment differs from the previous embodiment as to the arrangement of a third and a fourth switch 408 and 409 and the construction of the first to fourth convolution operation circuits 410 to 413. Since the convolution operation circuits 410 and 413 are identical in construction, let the following description concentrate on the circuit 410. As shown, the circuit 410 has a second selector 480 between the accumulator 360 and the adder 350. The second selector 480 is connected at one input terminal to the accumulator 360 and at the other input terminal to the accumulator of the adjacent convolution operation circuit (in this case, the circuit 411). Controlled by a controller, not shown, the selector 480 selects either one of the outputs of the two accumulators and feeds it to the adder 350. In this embodiment, each of the third and the fourth switches 408 and 409 has a first to a third input terminal, as shown FIG. 2. Specifically, in a DCT on IDCT mode, the third and the fourth switches select second or third input terminals, respectively, and in both modes, the selector 480 selects the output of the accumulator 360 belonging to the same circuit 410 as the selector 480, thereby implementing the function discussed with reference to FIG. 1. On the other hand, in an FIR filter mode, the selector 48 selects the output of the accumulator of the adjacent convolution operation circuit. At this instant, as shown in FIG. 2, the third and fourth switches 408 and 409 select the first input terminal. Specifically, the switch 408 selects the output terminal 300 to feed the input data directly to the convolution operation circuits 410 to 413, while the switch 409 selects the output of the accumulator 360 of the circuit 310 to deliver it to the output terminal 391. The coefficient memory 320 stores filter coefficients so that, in an FIR filter mode, the filter coefficients may be read thereoutof to effect multiplication. DCT and IDCT mode operations are the same as in the previous embodiment and, therefore, will not be described for simplicity.

Figure 3:
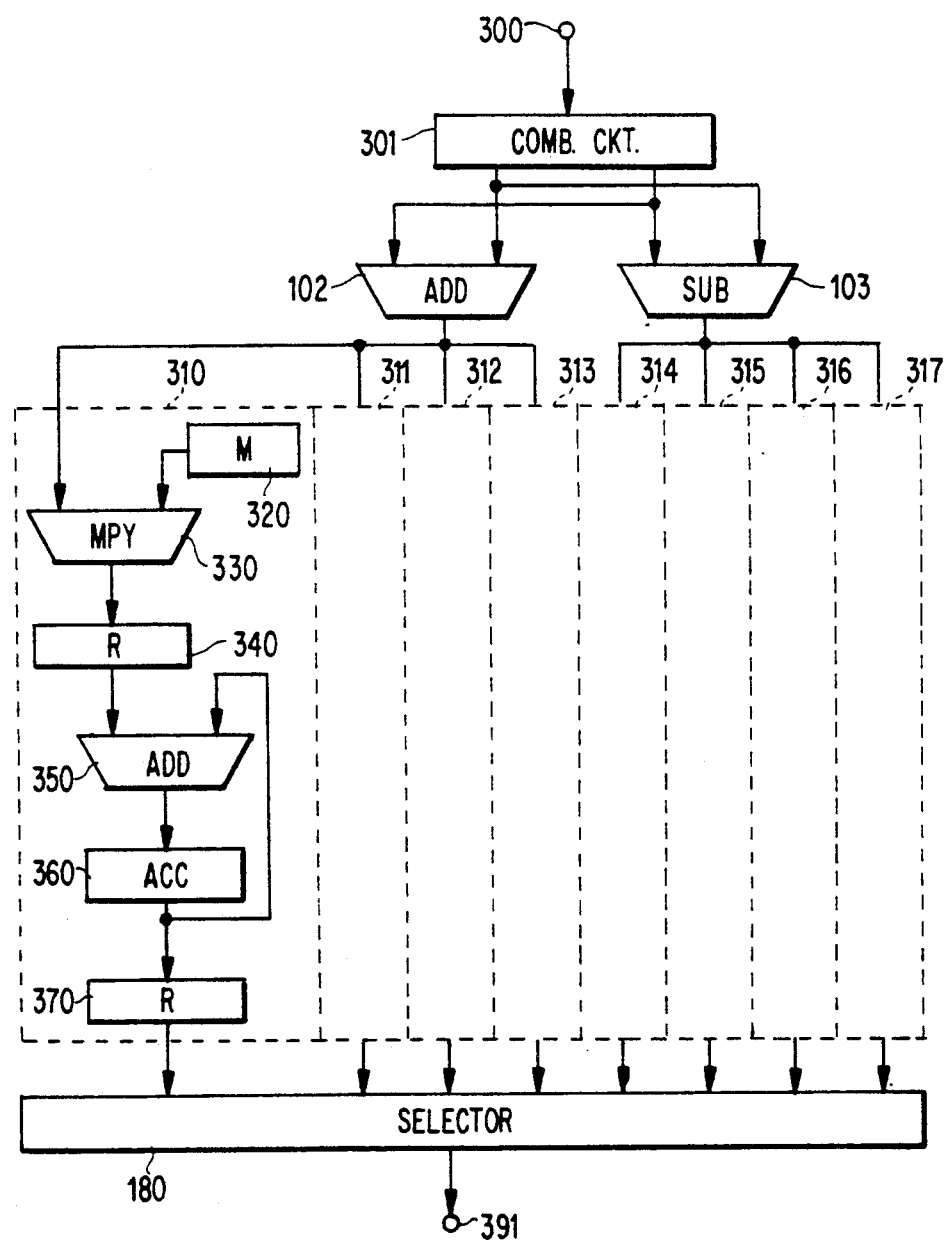
FIG. 3 is a block diagram showing another alternative embodiment of the present invention.

Another alternative embodiment of the present invention which realizes fast DCT is shown in FIG. 3. In the embodiments shown in FIGS. 1 and 2, 8-point one-dimensional inverse DCT (IDCT) operation is implemented by four convolution operation circuits and by producing eight different results of transform, or components, in two consecutive stages. This, however, requires a substantial operating time although reducing the circuit scale. In this particular embodiment, the same number of convolution operation circuits as the point are used to effect parallel procesing and thereby to enhance fast operations. FIG. 3 shows an 8-point one-dimensional DCT circuit in which the combining circuit 301 combines input data ($x_0$ to $x_7$) from the input terminal 300 to produce four combination data ($x_0$, $x_7$), ($x_1$, $x_6$), ($x_2$, $x_5$) and ($x_3$, $x_4$), as in the embodiments of FIGS. 1 and 2. These four combination data are applied to an adder 102 and a subtractor 103 which are independent of each other, whereby an addition term and a subtraction term are produced at the same time. The adder 102 delivers the addition term to, for example, the first to fourth convolution operation circuits 310 to 313, while the subtractor 103 feeds the subtraction term to a fifth to an eighth convolution operation circuit 314 to 317. The convolution operation circuits 310 to 317 each performs the convolution operation with the addition term or the subtraction term by reading a DCT coefficient out of the coefficient memory 320 thereof. The convolution results are fed from the individual circuits 310 to 317 to a selector 180. Each of these circuits 310 to 317 is constructed in the same manner as shown in FIG. 1, and redundant description will be avoided for simplicity. The selector 180 sequentially selects the first to eighth convolution data and delivers them to the output terminal 391 as DCT results $y_0$ to $y_7$. The addition term and subtraction term and the DCT coefficients are related, as follows. The combining circuit 301 outputs data ($x_0$, $x_7$) first. Then, adder 102 and the subtractor 103 produce ($x_0+x_7$) and ($x_0-x_7$), respectively. The first to fourth convolution circuits 310 to 313 read respectively DCT coefficients $C_{0,0}$, $C_{2,0}$, $C_{4,0}$ and $C_{6,0}$ (see equation (5)) out their DCT memories and multiply ($x_0+x_7$) by them. Likewise, the fifth to eighth convolution operation circuits 314 to 317 read respectively DCT coefficients $C_{1,0}$, $C_{3,0}$, $C_{5,0}$ and $C_{7,0}$ out of their DCT memories and multiply ($x_0-x_7$) by them. Thus, all that is required is storing the elements on the first to eight lines of the $8 \times 8$ DCT coefficient matrix of the equation (5) except for "0" in the coefficient memories of the first to eighth circuits 310 to 317, respectively, sequentially reading them out in response to the changes in the addition term (subtraction term), multiplying the addition term (substraction term) by the DCT coefficients by the multiplier 330, and accumulating the result of multiplication in the accumulator 360. Obviously, therefore, the construction shown in FIG. 3 halves the required operating time, compared to the construction of FIGS. 1 or 2.

Figure 4:
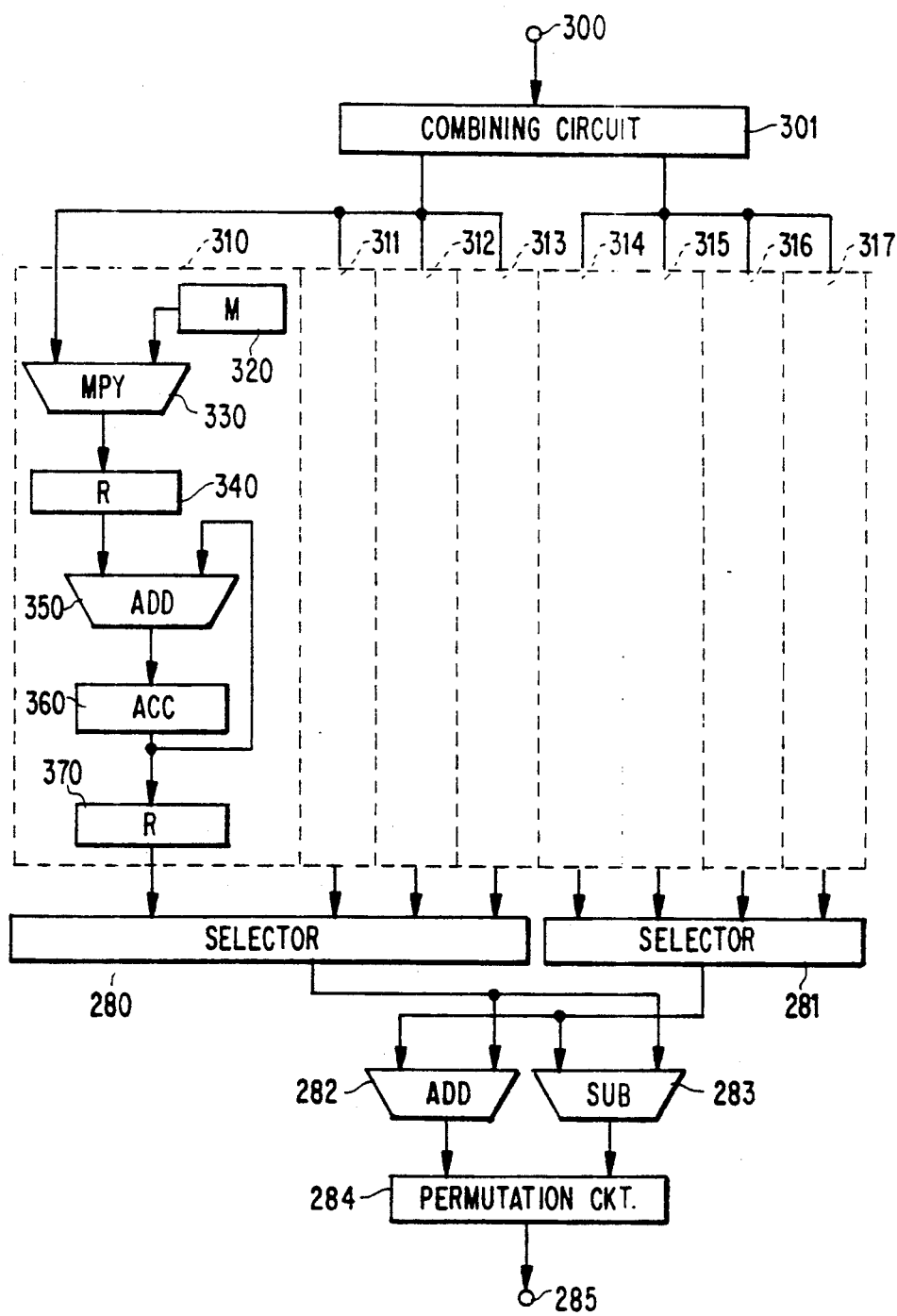
FIG. 4 is a block diagram showing an IDCT circuit implemented with the embodiment of FIG. 3.

FIG. 4 is a block diagram schematically showing an IDCT circuit implemented with the construction of FIG. 3. In the figure, the combining circuit 301 combines input data ($y_0$ to $y_7$) fed from the input terminal 300 to produce combination data ($y_0$, $y_1$), ($y_2$, $y_3$), ($y_4$, $y_5$) and ($y_6$, $y_7$). Assume that the first elements and the second elements of the individual combination data are applied to the first to fourth and the fifth to eighth convolution operation circuits 310 to 313 and 314 to 317, respectively. The coefficient memories of the first to eighth circuits 310 to 317 store respectively the IDCT coefficients other than "0" which constitute the $8 \times 8$ IDCT coefficient matrix of the equation (6) (e.g. the coefficient memory 320 of the first circuit 310 stores ($d_{0,0}$, $d_{0,2}$, $d_{0,4}$, $d_{0,6}$)), so that convolution operation may be performed as in the DCT circuit of FIG. 3. As a result, first to fourth convolution data $z_0$, $z_2$, $z_4$ and $z_6$ are fed to a first selector 280 while fifth to eighth convolution data $z_1$, $z_3$, $z_5$ and $z_7$ are fed to a second selector 281. The selector 280 sequentially selects $z_0$, $z_2$, $z_4$ and $z_6$ in this order while the selector 281 sequentially selects $z_1$, $z_3$, $z_5$ and $z_7$ in this order. The outputs of the selectors 280 and 281 are applied to both of an adder 282 and a subtractor 283. In response, the adder 282 and the subtractor 283 produce respectively $x_0 = z_0 + z_1$ and $x_4 = z_0 - z_1$ and deliver them to a permutation circuit 284. Thereafter, the adder 282 and the subtractor 282 deliver respectively $x_1$, $x_2$ and $x_3$ and $x_5$, $x_6$ and $x_7$ to the permutation circuit 284 in this order. On receiving all of the data $x_0$ to $x_7$, the permutation circuit 284 sequentially selects them in the same order while feeding them out via a terminal 285.

Figure 5:
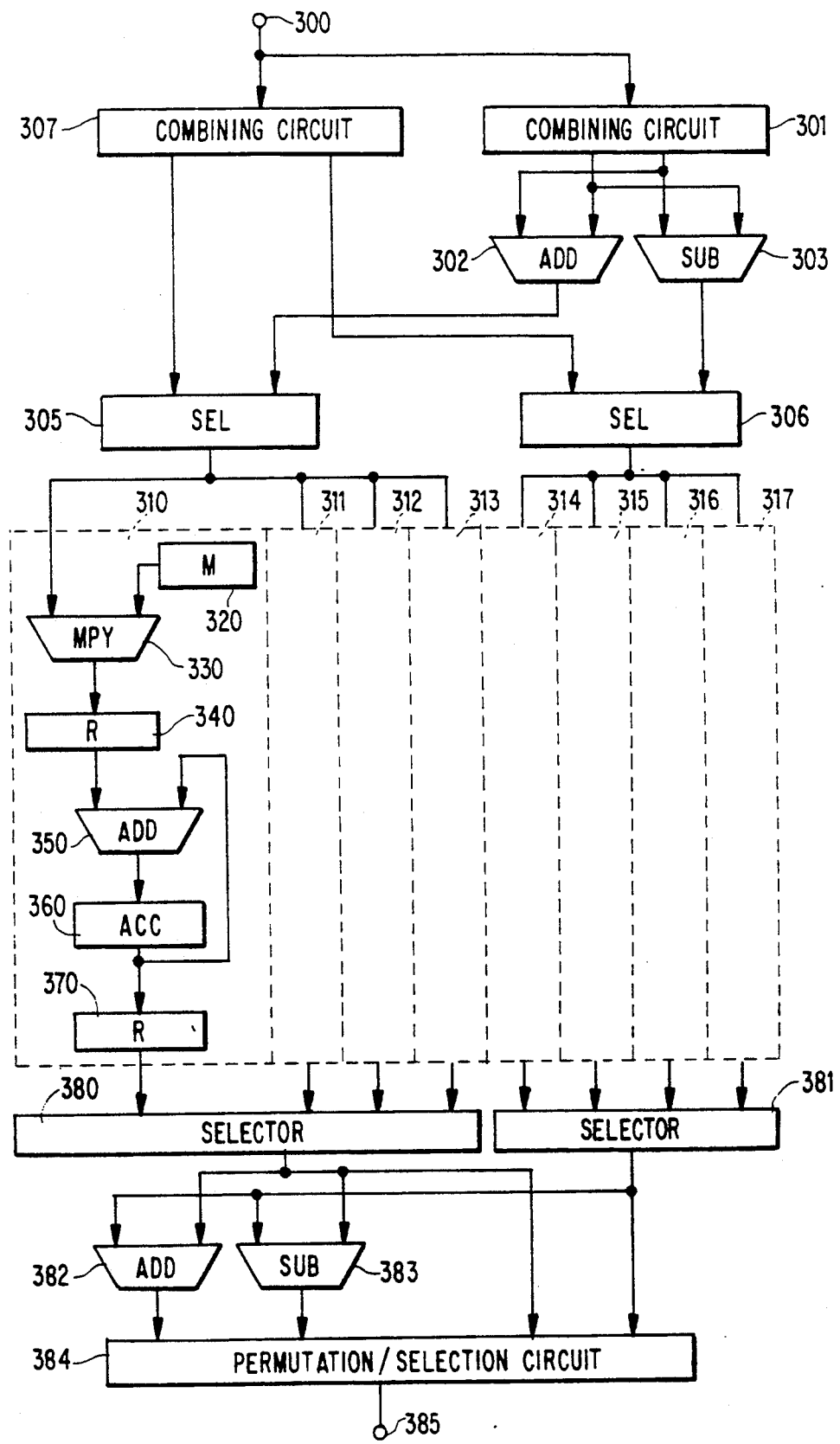
FIG. 5 is a block diagram showing another alternative embodiment of the present invention.

FIG. 5 shows a DCT/IDCT circuit which is the combination of the DCT circuit of FIG. 3 and the IDCT circuit of FIG. 4. In the figure, input data ($x_0$ to $x_7$ in a DCT mode or $Y_0$ to $Y_7$ in an IDCT mode and collectively represented by $s_0$ to $s_7$ hereinafter) are applied to a first and a second combining circuit 307 and 301 in parallel. In response, the combining circuit 307 produce four combination data ($s_0$, $s_1$), ($s_2$, $s_3$), ($s_4$, $s_5$) and ($s_6$, $s_7$) and feeds the first and second members of each data to a first and a second selector 305, respectively. On the other hand, the combining circuit 301 produces four combination data ($s_0$, $s_7$), ($s_1$, $s_6$), ($s_2$, $s_5$) and ($s_3$, $s_4$) and delivers them to an adder 302 and a subtractor 303. The adder 302 and the subtractor 303 in turn produce an addition term {($s_0+s_7$), ($s_1+s_6$), ($s_2+s_3$), ($s_3+s_4$)} and a subtraction term {($s_0-s_7$), ($s_1-s_6$), ($s_2-s_5$), ($s_3-s_4$)}, respectively. The addition output of the adder 302 is fed to the selector 305, for example, while the subtraction output of the subtractor 303 is fed to the selector 306. In a DCT mode, the selectors 305 and 306 select, for example, the addition term and the subtraction term outputted by the adder 302 and the subtractor 303, respectively. In an IDCT mode, the selectors 305 and 306 select respectively the first members and the second members of the combination data outputted by the combining circuit 307. The data selected by the selector 305 and the data selected by the selector 306 are applied to a first to a fourth convolution operation circuit 310 to 313 and a fifth to an eighth convolution operation circuit 314 to 317, respectively. The circuits 310 to 317 read DCT coefficients or IDCT coefficients out of the individual coefficient memories, perform convolution operations, and output the resulted first to eighth convolution data $m_0$ to $m_7$, respectively, as in the specific configuration shown in FIGS. 3 or 4. The first to fourth convolution data $m_0$ to $m_3$ and the fifth to eighth convolution data $m_4$ to $m_7$ are applied to a third and a fourth selector 380 and 381, respectively. Selecting respectively the first to fourth data and the fifth to eighth data in this order, the selectors 380 and 381 feed them to a second adder 382, a second subtractor 383, and a permutation/selection circuit 384. In a DCT mode, since the first to eighth convolution data $m_0$ to $m_7$ correspond respectively to $Y_0$, $Y_2$, $Y_4$, $Y_6$, $Y_1$, $Y_3$, $Y_5$ and $Y_7$ of the equation (5), the permutation/selection circuit 384 directly receives selection outputs of the selectors 380 and 381 and outputs $Y_0$ to $Y_7$ in this order. In an IDCT mode, the first to eighth convolution data $m_0$ to $m_7$ correspond respectively to $z_0$, $z_2$, $z_4$, $z_6$, $z_1$, $z_3$, $z_5$ and $z_7$ of the equation (6). Hence, the permutation/selection circuit 384 permutates the outputs $x_0$ to $x_3$ of the adder 382 and the outputs $x_4$ to $x_7$ of the subtractor 383 and feed them out in the order of $x_0$, $x_1$, $x_2$, $x_3$, $x_4$, $x_5$, $x_6$ and $x_7$. The specific construction shown in FIG. 5 implements a combined rapid DCT/IDCT circuit. In the embodiments of FIGS. 3 through 5, thr DCT/IDCT switching, combining circuits, permutating circuits and memories are controlled by a controller, not shown, in the same manner as in the embodiments of FIGS. 1 and 2.

Figure 6:
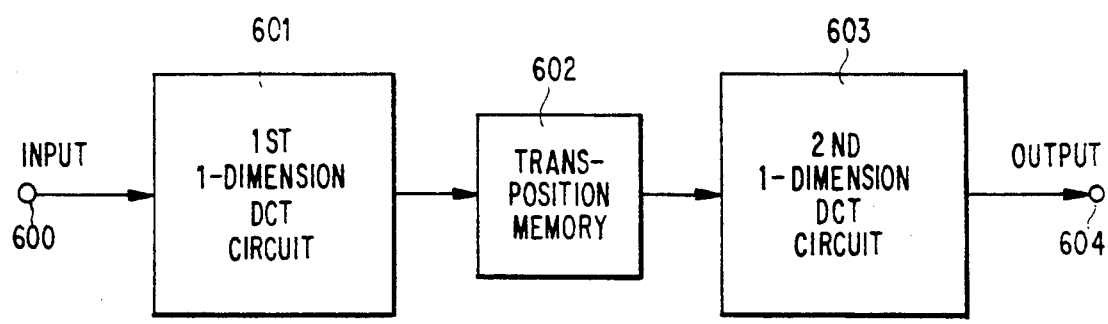
FIGS. 6 and 7 are block diagrams each showing a specific method of constructing a two-dimensional DCT circuit.

All the DCT (or IDCT or combined DCT/IDCT) circuits described above are directed toward one-dimensional DCT. A two-dimensional transform circuit may be implemented with any one of such one-dimensional transform circuit, as follows. FIG. 6 shows a specific construction of a two-dimensional transform circuit using one-dimensional transform circuits.

Two-dimensional DCT is achievable by transpositioning the result of one-dimensional DCT and again subjecting it to one-dimensional DCT, as well known in the art. The circuitry of FIG. 6, therefore, has a first one-dimensional DCT circuit 600 for performing DCT with input data coming in through a terminal 600, a transposition memory 602 for transpositioning the result of transform, and a second one-dimensional DCT circuit 603 for subjecting the output of the memory 602 again to one-dimensional DCT.

Figure 7:
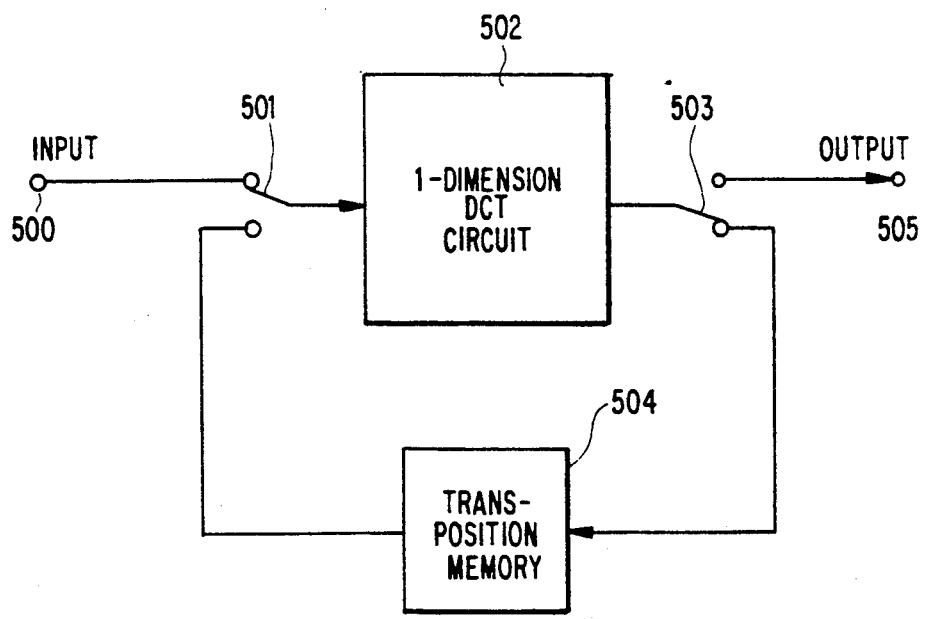

FIG. 7 shows another specific construction of the two-dimensional DCT circuit. The circuitry of FIG. 6 has two one-dimensional DCT circuits 601 and 603, but it does not use them at the same time. By contract, the circuitry of FIG. 7 implements two-dimensional DCT by use of a single one-dimensional DCT circuit. Specifically, input data applied to a terminal 500 is routed through a first switch 501 to a one-dimensional DCT circuit 502 and thereby subjected to the first one-dimensional DCT. The result of transform is delivered to a transposition memory 504 via a second switch 503. In response, the memory 504 transpositions the result of transform represented by a matrix and outputs it as transposition data. For the transposition, data may be written to the memory 504 in the row direction and read thereout of in the column direction. On the completion of the first one-dimensional DCT, the input of the switch 501 is connected to the memory 504 while the output of the switch 503 is connected to an output terminal 505. As a result, the transposition data is routed through the switch 501 to the DCT circuit 502 to undergo second one-dimensional DCT. The DCT circuit 502 feeds the result of second DCT as a two-dimensional DCT result to the output terminal 505. Of course, the one-dimensional DCT circuit or circuits shown in FIGS. 7 or 6 may be replaced with a one-dimensional IDCT circuit or circuits to effect two-dimensional IDCT. Further, any of the circuits shown in FIGS. 1 through 5 may be used to construct combined one-dimensional DCT/IDCT circuitry.

Figure 8:
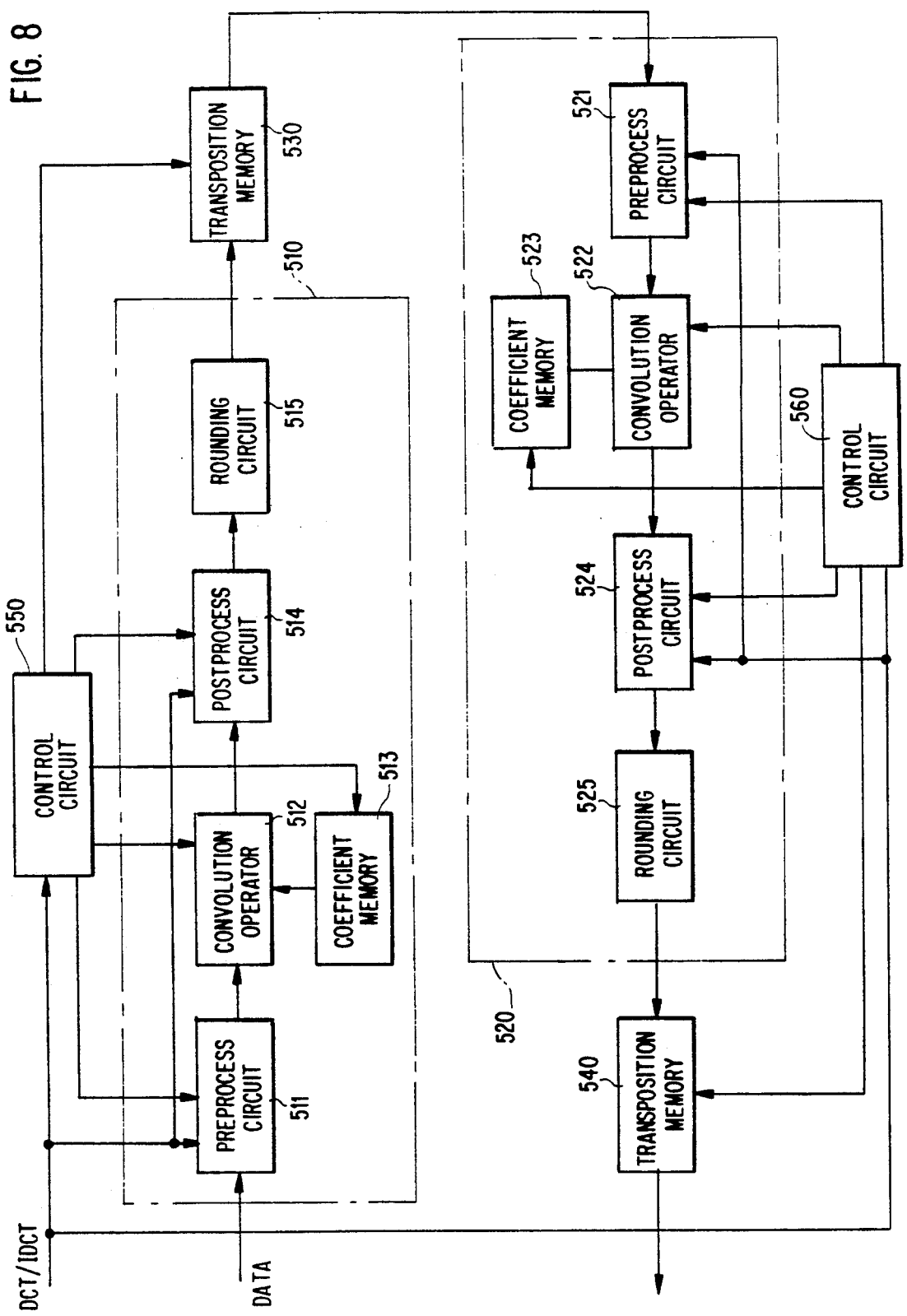
FIG. 8 is a block diagram showing a two-dimensional DCT circuit using the arrangement of FIG. 6.

Referring to FIG. 8, combined two-dimensional DCT/IDCT circuitry using the construction of FIG. 6 is shown. As shown, the circuitry has a first and a second one-dimensional DCT/IDCT circuit 510 and 520, a first and a second transposition memory 530 and 540, and a first and a second control circuit 550 and 560 for controlling various sections associated therewith. The first one-dimensional DCT/IDCT circuit 510 has a preprocess circuit 511, a convolution operator 512, a postprocess circuit 514, a rounding circuit 515, and a coefficient memory 513. The preprocess circuit 511 and postprocess circuit 514 each includes the combining circuit, adder/subtractor and permutation circuit which have been described with reference to FIGS. 1 and 2, for example. Either one of these circuits 511 and 514 is selected depending on the operation mode set up, i.e., DCT mode or IDCT mode. The convolution operator 512 and coefficient memory 513 constitute the convolution operation circuit shown in any of FIGS. 1 through 5. The rounding circuit 515 rounds off the DCT/IDCT result to a desired number of bits which is dependent on the number of bits of input data, the number of bits of DCT/IDCT coefficient, the required accuracy of transform result, etc. The second DCT/IDCT circuit 520 is identical in construction with the first DCT/IDCT circuit 510. The first transposition memory 530 corresponds to the transposition memory shown in FIGS. 6 and 7 while the second transposition memory 540 functions to transposition the two-dimensional DCT/IDCT result. In the two-dimensional DCT/IDCT circuitry shown in FIGS. 6 or 7, the transformed data resulted from two-dimensional DCT/IDCT have a transpositional relation with input data. Therefore, this embodiment has the second transposition memory 540 for matching the input data and the two-dimensional DCT/IDCT result associated therewith. However, this memory 540 is not necessary in the case that the transpositioned DCT/IDCT result is used by the succeeding circuitry as it is. The first control circuit 550 performs control relating to the first one-dimensional DCT/IDCT circuit 510 and first transposition memory 530, while the second control circuit 560 performs control relating to the second one-dimensional DCT/IDCT circuit 520 and second transposition memory 540. The one-dimensional DCT/IDCT circuits 510 and 520 each is operated in the same manner as the combined DCT/IDCT circuitry of FIGS. 1 or 5, and they cooperate as two-dimensional DCT/IDCT circuitry in the manner described with reference to FIG. 6. Briefly, in a two-dimensional DCT mode, the preprocess circuits 511 and 521 each plays the role of a combining circuit and an adder/subtractor, while the postprocess circuits 514 and 524 each serves the function of a permutation circuit. The control circuits 550 and 560 perform various kinds of control such as the control over the read-out of DCT coefficients from the associated coefficient memories 513 and 523 and suitable for the associated convolution operators, the control over the write-in and read-out of transform results from the associated transposition memories 530 and 540. On the other hand, in a two-dimensional IDCT mode, the preprocess circuits 511 and 521 each serves as a permutation circuit while the postprocess circuits 514 and 524 each serves as a combining circuit and an adder/subtractor. In this mode of operation, the control circuits 550 and 560 causes IDCT coefficients to be read out of the associated coefficient memories and fed to the convolution operators 512 and 522 in place of DCT coefficients.

Figure 9:
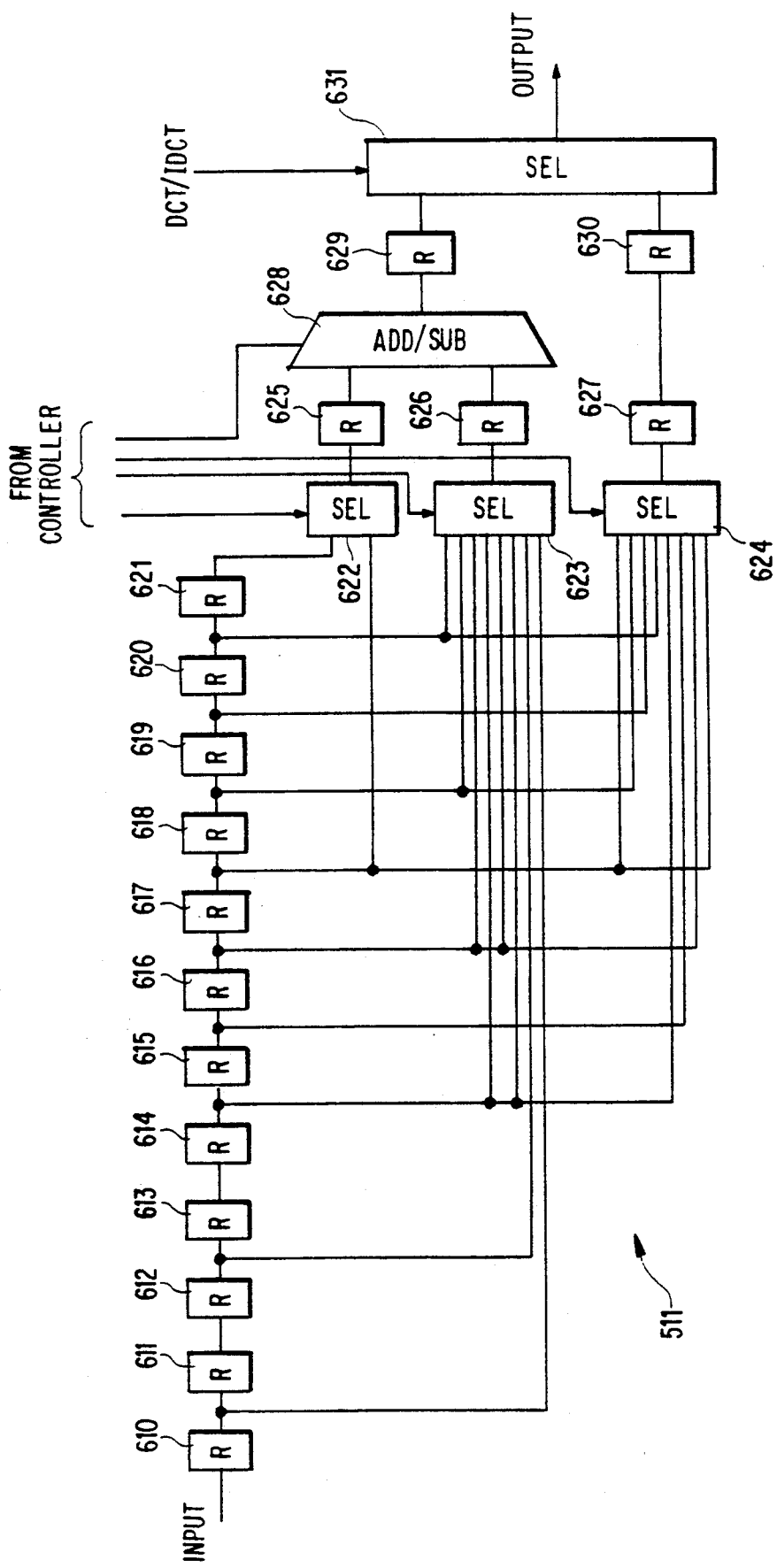
FIG. 9 is a block diagram showing a specific construction of a preprocess circuit included in the circuit of FIG. 8.

FIG. 9 shows a specific construction of any of the proprocess circuits 511 and 521 of FIG. 8, which implements 8×8 two-dimensional DCT/IDCT. It is to be noted that 8×8 two-dimensional DCT/IDCT allows eight times of 8×1 (8-point one-dimensional) DCT/IDCT to be handled collectively and, therefore, the operation is the same as the operation to be performed by the combining circuit and permutation circuit included in an 8-point one-dimensional DCT/IDCT circuit. In FIG. 9, the preprocess circuit 511 has a first to a seventeenth register 610 to 621, 625 to 627, 629 and 630, a first to a fourth selector 622 to 624 and 631, and an adder/subtractor 628. Constituting a 12-stage shift register in combination, the registers 610 to 621 each delays an input thereto by one period of a fundamental clock which is fed from a clock signal source, not shown. Such a shift register cooperates with the first and second selectors 622 and 623 and the thirteenth and fourteenth registers 625 and 626 to constitute a combining circuit. Likewise, the shift register cooperates with the third selector 624 and fifteenth register 627 to constitute a permutation circuit. The adder/subtractor 628, like the adder/subtractor 301 of FIG. 1, outputs an addition term and a subtraction term by using combined data fed thereto from the registers 625 and 626. The sixteenth and seventeenth registers 629 and 630 are timing adjusting registers for causing the addition and subtraction terms from the adder/subtractor 628 and the selected data from the fifteenth register 627 to reach the fourth selector 631 at the same time. The selector 631 selects, in a DCT mode, the addition and subtraction terms from the register 629 or selects, in an IDCT mode, permutated data from the register 630, delivering it to the convolution operator 512. Input data such as $x_0$ to $x_7$ are constantly shifted in the registers, or shift register, 610 to 621. Assume that $x_0$ to $x_7$ exist respectively in the registers 617 to 610 at a given timing. Then, at the next timing, $x_0$ to $x_7$ are bodily moved to the right direction with the result that $x_0$ and $x_7$ are stored in the registers 618 and 611, respectively. At this instant, the leading data of the next input data vector ($x'_0, x'_1, \ldots, x'_7$), i.e., $x'_0$ is stored in the register 610. In this manner, the data stored in the registers 610 to 621 constantly change every period of the fundamental clock. What and when the selectors 622 and 624 should select is controlled by the control circuit 550.

Figure 10:
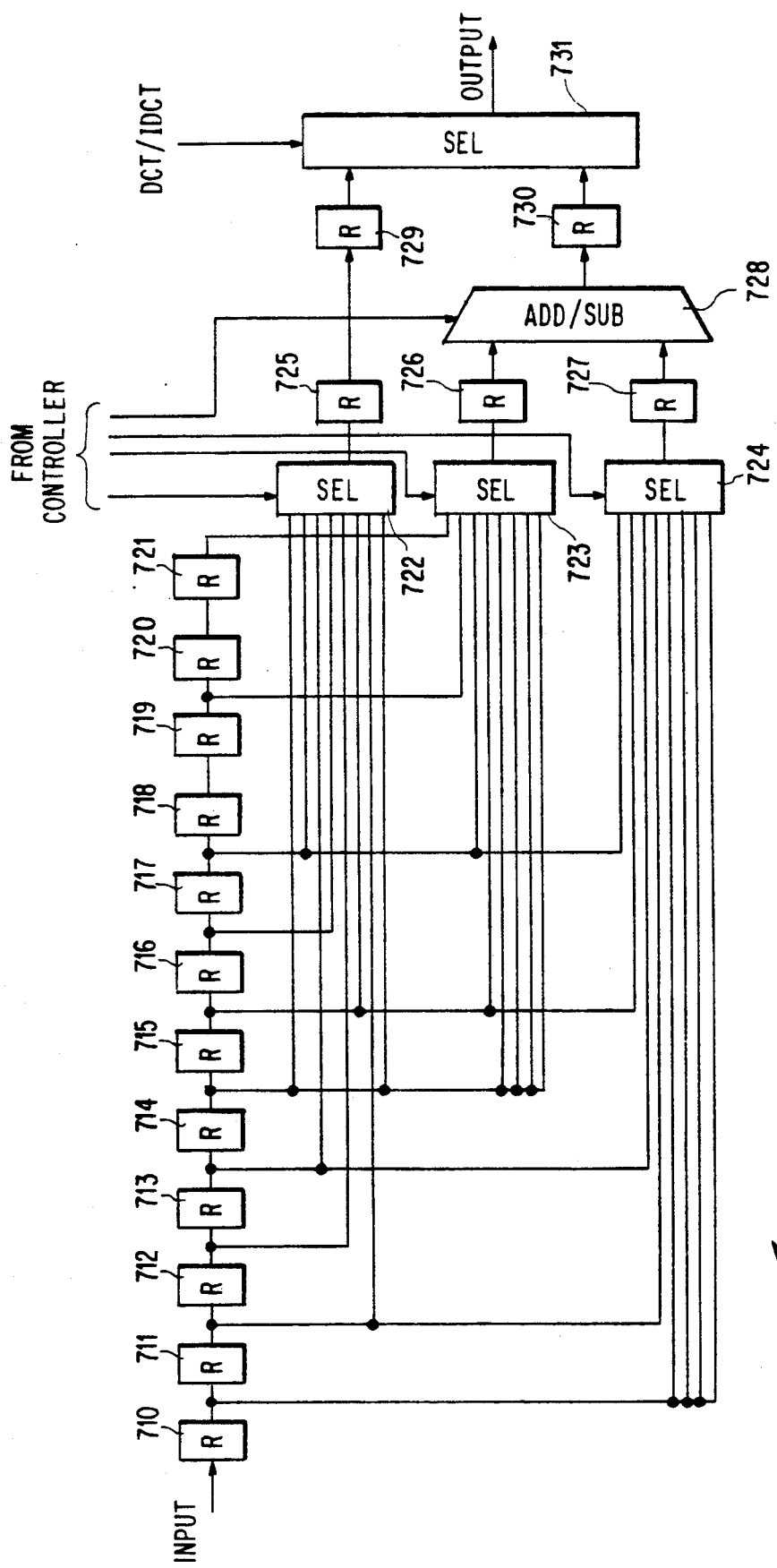
FIG. 10 is a block diagram showing a specific construction of a postprocess circuit also included in the circuit of FIG. 8.

FIG. 10 shows a specific construction of the postprocess circuit 514 associated with the preprocess circuit of FIG. 9. As shown, the postprocess circuit 514, like the preprocess circuit, has a first to a twelfth register 710 to 720 constituting a 12-stage shift register, a first to a fourth selector 722 to 724 and 731, an adder/subtractor 728, and a thirteenth to seventeenth register 725 to 727, 729 and 730. The selector 722, register 725 and shift register constitute a permutation circuit while the selectors 723 and 724, register 726 and shift register constitute a combining circuit. The postprocess circuit 514 operates in the same manner as the preprocess circuit of FIG. 9 except that it selects the permutated data from the register 729 in a DCT mode or the addition and subtraction results from the register 730 in an IDCT mode. Selection commands meant for the selectors 722 to 724 are also fed from the control circuit 550.

In summary, the present invention provides a simple DCT/IDCT circuit capable of executing either one of DCT and IDCT with input data selectively and at high speed. In addition, the present invention readily implements the application of such a DCT/IDCT circuit to a two-dimensional DCT/IDCT circuit.

Various modifications will become possible for those skilled in the art after receiving the teachings of the present disclosure without departing from the scope thereof.

What is claimed is:

1. A discrete cosine transform (DCT) circuit for performing DCT or inverse DCT (IDCT) with N ($N=2^x$ where x is a natural number) input data in response to a selection signal fed from the outside so as to produce transformed data, said DCT circuit comprising:
   (a) first switch means for producing first selected input data by selecting, in response to the selection signal, either one of input data and selected accumulation data produced in said DCT circuit;
   (b) combining circuit means for transforming N of said first selected input data into N/2 combination data each comprising a combination of two predetermined data;
   (c) adding and subtracting means for producing N subtraction and addition data by adding first and second data of each of said combination data and subtracting said second data from said first data;
   (d) second switch means for producing second selected input data by selecting, in response to the selection signal, either one of said input data and said selected accumulation data;
   (e) permutation circuit means for outputting permutated data by permutating N of said second selected input data in a predetermined order;
   (f) third switch means for outputting data to be transformed by selecting, in response to the selection signal, either one of said addition and subtraction data and said permutated data;
   (g) fourth switch means for outputting said transformed data by selecting, in response to the selection signal, the other of said permutated data and said addition and subtraction data;
   (h) N/2 transforming circuit means for transforming data having an identical construction and each comprising:
      (i) coefficient memory means storing DCT coefficients and IDCT coefficients;
      (ii) multiplier means for reading, in response to the selection signal, either one of said DCT coefficients and said IDCT coefficients out of said memory means and multiplying said data to be transformed by said coefficients to produce multiplication data; and
      (iii) accumulator means for accumulating said multiplication data a predetermined number of times to output accumulated data;
   (i) selector means for selecting said accumulated data from said N/2 transforming circuit means in a predetermined order and feeding said selected accumulated data to said first and second switch means as selected accumulated data.

2. The DCT circuit of claim 1, wherein said DCT circuit produces a one-dimensional DCT result based on said input data and a two-dimension DCT result based on transposition data, and wherein said DCT circuit further comprises transpositioning means receiving said one-dimensional DCT result for transpositioning said one dimensional DCT result to produce said transposition data.

3. A DCT circuit for performing DCT or IDCT with N ($N=2^x$ where x is a natural number) input data in response to a selection signal fed from the outside so as to produce transformed data, said DCT circuit comprising:
   (a) first switch means for producing first selected input data by selecting, in response to the selection signal, either one of input data and selected accumulation data produced in said DCT circuit;
   (b) combining circuit means for transforming N of said first selected input data into N/2 combination data each comprising a combination of two predetermined data;
   (c) adding and subtracting means for producing N subtraction and addition data by adding first and second data of each of said combination data and subtracting said second data from said first data;
   (d) second switch means for producing second selected input data by selecting, in response to the selection signal, either one of said input data and said selected accumulation data;
   (e) permutation circuit means for outputting permutated data by permutating N of said second selected input data in a predetermined order;
   (f) third switch means for outputting data to be transformed by selecting, in response to the selection signal, one of said input data, said addition and subtraction data and said permutated data;
   (g) N/2 transforming circuit means for transforming data having an identical construction, m-th ($2 \leq m \leq N/2$ where m is an integer) one of said N/2 transforming circuit means comprising:
      (i) coefficient memory means storing DCT coefficients, IDCT coefficients, and filter coefficients;
      (ii) multiplier means for reading, in response to the selection signal, one of said DCT coefficients, said IDCT coefficients and said filter coefficients out of said memory means and multiplying said data to be transformed by said coefficients to produce multiplication data;

(iii) adder means for adding said multiplication data and locally accumulated data to output updated accumulation data;

(iv) first selector means for selecting, in response to the selection signal, either one of said updated accumulation data and said updated accumulation data in the (m-l)-th transforming circuit means to output said locally accumulated data; and (v) register means for outputting said updated accumulation data at a predetermined period as accumulation data;

(h) first one of said N/2 transforming circuit means comprising:

(i) coefficient memory means storing DCT coefficients, IDCT coefficients, and filter coefficients;

(ii) multiplier means for reading, in response to the selection signal, one of said DCT coefficients, said IDCT coefficients and said filter coefficients out of said memory means and multiplying said data to be transformed by said coefficients to produce multiplication data;

(iii) adder means for adding said multiplication data and locally accumulated data to output updated accumulation data; and (iv) register means for accumulating said updated accumulation data at a predetermined period to output accumulation data;

(i) fourth switching means for selecting, in response to the selection signal, one of said updated accumulation data from the N/2-th transforming circuit means, said permutated data, and said subtraction and addition data to output said transformed data; and (j) selector means for selecting said accumulation data from said N/2 transforming circuit means in a predetermined order and feeding said selected accumulation data to said first and second switch means as said selected accumulation data.

4. The DCT circuit of claim 3, wherein said DCT circuit produces a one-dimensional DCT result based on said input data and a two-dimension DCT result based on transposition data, and wherein said DCT circuit further comprises transpositioning means receiving said one-dimensional DCT result for transpositioning said one dimensional DCT result to produce said transposition data.

5. A DCT circuit for performing DCT with N one-dimensional data ($N=2^x$ where x is a natural number), comprising:

(a) combining circuit means for transforming each N input data into N/2 combination data each consisting of two predetermined data, and outputting first and second data constituting each of said combination data in parallel;

(b) first adder means for producing first addition data by adding said first and second data;

(c) subtractor means for producing substraction data by subtracting said second data from said first data;

(d) N transforming circuit means for transforming data having an identical construction and each comprising:

(i) coefficient memory means storing DCT coefficients;

(ii) multiplier means for multiplying data to be transformed by said DCT coefficients read out of said coefficient memory to output multiplication data;

(iii) second adder means for adding said multiplication data and locally accumulated data to output second addition data; and (iv) register means for outputting said second addition data as said locally accumulated data and outputting, at a predetermined period, said second addition data as accumulation data;

(e) distributing means for feeding said first addition data to, among said N transforming circuit means, N/2 transforming circuit means as said data to be transformed and feeding said subtraction data as said data to be transformed to the other N/2 transforming circuit means; and (f) selector means for outputting said accumulation data from said N transforming circuit means in a predetermined order as a DCT result of said input data.

6. The DCT circuit of claim 5, wherein said DCT circuit produces a one-dimensional DCT result based on said input data and a two-dimension DCT result based on transposition data, and wherein said DCT circuit further comprises transpositioning means receiving said one-dimensional DCT result for transpositioning said one dimensional DCT result to produce said transposition data.

7. An IDCT circuit for performing IDCT with N ($N=2^x$ where x is a natural number) one-dimensional transformed data resulted from DCT of N one-dimensional data, comprising:

(a) combining circuit means for transforming said N transformed data into N/2 combination data each consisting of two predetermined data, and outputting first and second data constituting each of said combination data in parallel;

(b) N transforming circuit means for transforming data having an identical construction and each comprising:

(i) coefficient memory means storing DCT coefficients;

(ii) multiplier means for multiplying data to be transformed by said DCT coefficients read out of said coefficient memory to output multiplication data;

(iii) first adder means for adding said multiplication data and locally accumulated data to output first addition data; and (iv) register means for outputting said first addition data as said locally accumulated data and outputting, at a predetermined period, said first addition data as accumulation data;

(c) distributing means for feeding said first addition data to, among said N transforming circuit means, N/2 transforming circuit means as said data to be transformed and feeding second addition data as said data to be transformed to the other N/2 transforming circuit means;

(d) first selector means for outputting said accumulation data from said N/2 transforming circuit means in a predetermined order as first selected accumulation data;

(e) second selector means for outputting said accumulation data from said other N/2 transforming circuit means in a predetermined order as second selected accumulation data;

(f) second adder means for adding said first and second selected accumulation data to output second addition data;

(g) subtractor means for subtracting said second selected accumulation data from said first selected accumulation data to output substraction data; and (h) permutating circuit means for outputting said second addition data and said subtraction data after permutating said data in a predetermined order.

8. The IDCT circuit of claim 7, wherein said IDCT circuit produces a one-dimensional IDCT result based on said input data and a two-dimension IDCT result based on transposition data, and wherein said IDCT circuit further comprises transpositioning means receiving said one-dimensional IDCT result for transpositioning said one dimensional IDCT result to produce said transposition data.

9. A DCT circuit for performing N-degree ($N=2^x$ where x is a natural number) DCT or IDCT in response to a selection signal fed from the outside, said DCT circuit comprising:

(a) first combining circuit means for transforming, according to a predetermined first combination, each N input data into first N/2 combination data each consisting of two predetermined data, and outputting first and second data constituting each of said first combination data in parallel;

(b) first adder means for adding said first and second data to produce first addition data;

(c) first subtractor means for subtracting said second data from said first data to produce first subtraction data;

(d) second combining circuit means for transforming, according to a predetermined second combination, said each N input data into second N/2 combination data each consisting of two predetermined data, and outputting third and fourth data constituting each of said second combination data in parallel;

(e) first selector means for selecting either one of said third data and said first addition data in response to the selection signal to output said selected data as first selected data;

(f) second selector means for selecting either one of said fourth data and said subtraction data in response to the selection signal to output said selected data as second selected data;

(g) N transforming circuit means for transforming data having an identical construction and each comprising:
  (i) coefficient memory means storing DCT coefficients;
  (ii) multiplier means for multiplying data to be transformed by said DCT coefficients read out of said coefficient memory to output multiplication data;
  (iii) second adder means for adding said multiplication data and locally accumulated data to output said addition data; and
  (iv) register means for outputting said second addition data as said locally accumulated data and outputting, at a predetermined period, said second addition data as accumulation data;

(h) distributing means for feeding said first selected data to, among said N transforming circuit means, N/2 transforming circuit means as said data to be transformed and feeding second selected data as said data to be transformed to the other N/2 transforming circuit means;

(i) third selector means for outputting said accumulation data from said N/2 transforming circuit means in a predetermined order as first selected accumulation data;

(j) fourth selector means for outputting said accumulation data from said other N/2 transforming circuit means in a predetermined order as second selected accumulation data;

(k) third adder means for adding said first and second selected accumulation data to produce third addition data;

(l) second subtractor means for subtracting said second selected accumulation data from said first selected accumulation data to produce second subtraction data; and (m) permutation circuit means for permutating, in response to the selection signal;
  (i) said third and fourth selected data in a predetermined order to output said permutated data as a DCT result, or
  (ii) permutating said third addition data and said second subtraction data in a predetermined order to output said permutated data as an IDCT result.

10. The DCT circuit of claim 9, wherein said DCT circuit produces a one-dimensional DCT result based on said input data and a two-dimension DCT result based on transposition data, and wherein said DCT circuit further comprises transpositioning means receiving said one-dimensional DCT result for transpositioning said one dimensional DCT result to produce said transposition data.

11. A DCT circuit for performing DCT with $N \times N$ ($N=2^x$ where x is a natural number) input data, comprising:

(a) first switch means for selecting and outputting, in response to a first control signal fed from the outside, either one of said input data and transposition data as data to be transformed;

(b) a one-dimensional DCT circuit for performing N-degree one-dimensional DCT with said data to be transformed to output first transformed data;

(c) second switch means for outputting, in response to a second control signal fed from the outside, said first transformed data via one output as a two-dimensional DCT result or via the other output as a one-dimensional DCT result; and (d) transpositioning means for transpositioning said one-dimensional DCT result to output said transpositioning data;

wherein said one-dimensional DCT circuit further comprises:
  a plurality of registers;
  a plurality of selectors;
  a shift register receiving said input data comprising a first group of said registers electrically coupled serially to one another;
  a combining circuit for combining said input data to produce combined data, said combining circuit comprising said shift register, a second group of said registers, and first and second ones of said selectors electrically coupled to one another; and
  a permutation circuit for receiving and permutating said combined data, said permutation circuit comprising said shift register, a third one of said selectors and at least one other of said registers electrically coupled to one another.

12. A two-dimensional DCT circuit for performing $N \times N$ two-dimensional DCT or IDCT with N-degree ($N=2^x$ where x is a natural number) input data in response to a selection signal fed from the outside, said DCT circuit comprising:

(a) first one-dimensional DCT/IDCT circuit means for performing, in response to the selection signal, N-degree one-dimensional DCT or N-degree one-dimensional IDCT with said input data and outputting a transform result as first transformed data;

(b) transpositioning means for transpositioning said first transformed data to output transposition data; and (c) second DCT/IDCT circuit means for performing, in response to the selection signal, one of the N-degree one-dimensional DCT and the N-degree one-dimensional IDCT which said first DCT/IDCT circuit has performed with said input data with said transposition data, when performing the N-degree one-dimensional DCT outputting a transform result as a two-dimensional DCT result associated with said input data, and when performing the N-degree one-dimensional IDCT outputting a transform result as a two-dimensional IDCT result;

wherein said one-dimensional DCT circuit further comprises:

a plurality of registers;

a plurality of selectors;

a shift register receiving said input data, said shift register comprising a first group of said registers electrically and serially coupled to one another;

a combining circuit for combining said input data to produced combined data, said combining circuit comprising said shift register, a second group of said registers, and first and second ones of said selectors electrically coupled to one another; and a permutation circuit for permutating said combined data, said permutation circuit comprising said shift register, a third one of said selectors and at least one other of said registers electrically coupled to one another.

* * * * *

UNITED STATES PATENT AND TRADEMARK OFFICE
CERTIFICATE OF CORRECTION

PATENT NO. : 5,181,183
DATED : January 19, 1993
INVENTOR(S) : Takashi MIYAZAKI

It is certified that error appears in the above-identified patent and that said Letters Patent is hereby corrected as shown below:

Col. 7, line 41, delete "sequences" and insert --sequence--;

line 54, delete "circuits" and insert --circuit--;

Col. 8, line 21, delete "48" and insert --480--.

Signed and Sealed this

Thirtieth Day of November, 1993

Attest:

BRUCE LEHMAN

Attesting Officer

Commissioner of Patents and Trademarks